US012228641B2

(12) United States Patent
Hustava et al.

(10) Patent No.: US 12,228,641 B2
(45) Date of Patent: Feb. 18, 2025

(54) ULTRASONIC BREATHING SENSOR AND SENSING METHOD FOR VEHICLE OCCUPANT MONITORING

(71) Applicant: SEMICONDUCTOR COMPONENTS INDUSTRIES, LLC, Scottsdale, AZ (US)

(72) Inventors: Marek Hustava, Bratislava (SK); Pavel Kostelnik, Bordovice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 29 days.

(21) Appl. No.: 18/355,284

(22) Filed: Jul. 19, 2023

(65) Prior Publication Data
US 2024/0264303 A1 Aug. 8, 2024

Related U.S. Application Data

(60) Provisional application No. 63/483,229, filed on Feb. 3, 2023.

(51) Int. Cl.
*G01S 15/52* (2006.01)
*B60R 21/015* (2006.01)
(Continued)

(52) U.S. Cl.
CPC ...... *G01S 15/523* (2013.01); *B60R 21/01536* (2014.10); *G01S 7/53* (2013.01); *G01S 7/539* (2013.01)

(58) Field of Classification Search
CPC . G01S 15/523; G01S 7/539; B60R 21/01536; B60W 40/08
See application file for complete search history.

(56) References Cited

U.S. PATENT DOCUMENTS 7,276,030 B2 * 10/2007 Takasuka .......... B60R 21/01552
600/534
9,434,275 B2 * 9/2016 Maley .................... G08B 21/24
(Continued)

FOREIGN PATENT DOCUMENTS

CN 105015551 B 4/2018
DE 102019203688 A1 9/2020
(Continued)

OTHER PUBLICATIONS

"Hyundai Mobis develops 'in-cabin systems' utilizing the state-of-the-art autonomous driving sensors one after another," HMG Newsroom, Jun. 13, 2022, 5 pages.

*Primary Examiner* — John A Tweel, Jr.
(74) *Attorney, Agent, or Firm* — Ramey LLP

(57) ABSTRACT

Breathing sensors, sensing methods, and vehicle occupant monitoring systems may employ ultrasonic transducers. One illustrative sensing method includes: sensing an acoustic transducer's responses to a series of acoustic bursts emitted in a vehicle's cabin; differencing pairs of said responses to obtain difference signals; converting the difference signals into magnitude signals; performing peak detection on each of the magnitude signals to obtain at least one peak amplitude; and providing a breathing signal based on the at least one peak amplitude. The breathing signal may be an occupancy detection flag, an occupant position, a breathing frequency, and/or any combination thereof.

20 Claims, 5 Drawing Sheets

(51) Int. Cl.
*G01S 7/53* (2006.01)
*G01S 7/539* (2006.01)

(56) References Cited

U.S. PATENT DOCUMENTS

| | | |
|---|---|---|
| 10,435,035 B2 | 10/2019 | Wiegand et al. |
| 11,197,637 B2 * | 12/2021 | Montgomery ....... A61B 5/1102 |
| 11,707,197 B2 * | 7/2023 | Shouldice ................ A61B 5/05 |
| | | 340/573.1 |
| 2017/0090475 A1 | 3/2017 | Choi et al. |
| 2020/0283001 A1 | 9/2020 | Kulkarni |
| 2020/0297955 A1 * | 9/2020 | Shouldice .............. G16H 40/67 |
| 2020/0383580 A1 * | 12/2020 | Shouldice ............ A61B 5/0816 |
| 2022/0234534 A1 | 7/2022 | Elad et al. |

FOREIGN PATENT DOCUMENTS

| | | |
|---|---|---|
| FR | 2571955 A1 | 4/1986 |
| JP | 2009280057 A | 12/2009 |
| JP | 2016-193020 A | 11/2016 |

\* cited by examiner

ULTRASONIC BREATHING SENSOR AND SENSING METHOD FOR VEHICLE OCCUPANT MONITORING

CROSS-REFERENCE TO RELATED APPLICATIONS

The present application claims priority to Provisional U.S. Application 63/483,229, filed 2023 Feb. 3 and titled "Driver Monitoring and/or Rear Seat Occupancy Detection Using Ultrasonic Sensor" by inventor Marek Hustava. The foregoing application is hereby incorporated herein by reference in its entirety.

BACKGROUND

Vehicle manufacturers often employ occupancy sensors to detect which seats are occupied during operation. Such sensors enable manufacturers to offer features for enhancing passenger safety or comfort, e.g., seatbelt reminders, seatbelt pre-tensioning, airbag enablement, child presence reminders, accessory power timeout adjustment. New safety standards being considered by road safety certification authorities may even mandate more sophisticated systems for reminders to check the rear seats when exiting the vehicle and for monitoring driver status or attention, particularly in connection with partially automated driver assistance systems.

Traditionally each seat may be equipped with an occupancy sensor in the form of a weight sensor. Recognizing that weight sensors often suffer from "false positive" detections when objects such as backpacks or purses are placed on the seat, others have proposed to address such shortcomings with radar sensors (see, e.g., U.S. application Ser. No. 17/157,039 "Centralized Occupancy Detection System" by inventors D. Elad and D. Corcos), wearable devices (see, e.g., U.S. application Ser. No. 15/188,074 "Driver Monitoring Method and Apparatus using Wearable Device" by inventors C. Choi et al), and hybrid sensor systems (see, e.g., "Hyundai Mobis develops 'in-cabin systems' utilizing the state-of-the-art autonomous driving sensors one after another!" published 2022 Jun. 13 by HMG Newsroom). However, the automotive industry is highly cost sensitive, and these proposals are comparatively costly and moreover may require bulky sensors or inconvenient donning of wearable devices.

SUMMARY

Accordingly, there are disclosed herein illustrative breathing sensors, sensing methods, and vehicle occupant monitoring systems employing ultrasonic transducers. One illustrative sensing method includes: sensing an acoustic transducer's responses to a series of acoustic bursts emitted in a vehicle's cabin; differencing pairs of said responses to obtain difference signals; converting the difference signals into magnitude signals; performing peak detection on each of the magnitude signals to obtain at least one peak amplitude; and providing a breathing signal based on the at least one peak amplitude.

An illustrative breathing sensor includes a controller for an acoustic transducer. The controller includes at least: a receiver configured to sense an acoustic transducer's response to each of a series of acoustic bursts emitted in a vehicle's cabin; and a processing circuit configured to derive a breathing signal from said responses in part by: obtaining difference signals from pairs of said responses; converting each difference signal into a magnitude signal; and performing peak detection on each said magnitude signal to obtain at least one peak amplitude.

An illustrative occupant monitoring system may be used in a vehicle having at least one seat configured to accommodate an occupant. The system includes at least one acoustic transducer configured to receive a series of acoustic burst echoes from the occupant when the occupant is present; and a controller configured to derive a breathing signal from the series of acoustic burst echoes.

Each of the foregoing examples can be employed individually or in conjunction and may include one or more of the following features in any suitable combination: 1. said performing peak detection includes determining a peak amplitude for each of multiple peaks in each of the magnitude signals. 2. a breathing signal is determined for each of the multiple peaks. 3. associating each of the breathing signals with a respective position in the vehicle's cabin. 4. said providing a breathing signal includes comparing the at least one peak amplitude to a predetermined threshold. 5. said providing a breathing signal includes asserting the breathing signal only if a moving window contains at least a minimum number of times that the peak amplitude exceeds the predetermined threshold. 6. said providing a breathing signal includes determining a breathing frequency. 7. said providing a breathing signal includes performing a Fourier Transform of the at least one peak amplitude as a function of time to determine the breathing frequency. 8. setting an alert if the breathing frequency indicates an impaired driver. 9. setting an alert if the breathing signal indicates a rear seat occupant when a front door is opened. 10. a status register having a flag signifying whether the breathing frequency indicates an impaired driver. 11. the multiple peaks a magnitude signals corresponding to occupants of different seats in the vehicle and the controller is configured to derive a breathing signal for each occupant. 12. the at least one acoustic transducer is integrated with a component of an audio system for the vehicle, the component including a microphone or speaker.

DETAILED DESCRIPTION

The following description and accompanying drawings are provided for explanatory purposes, not to limit the disclosure. To the contrary, they provide the foundation for one of ordinary skill in the art to understand all modifications, equivalents, and alternatives falling within the scope of the claims.

Figure 1A:
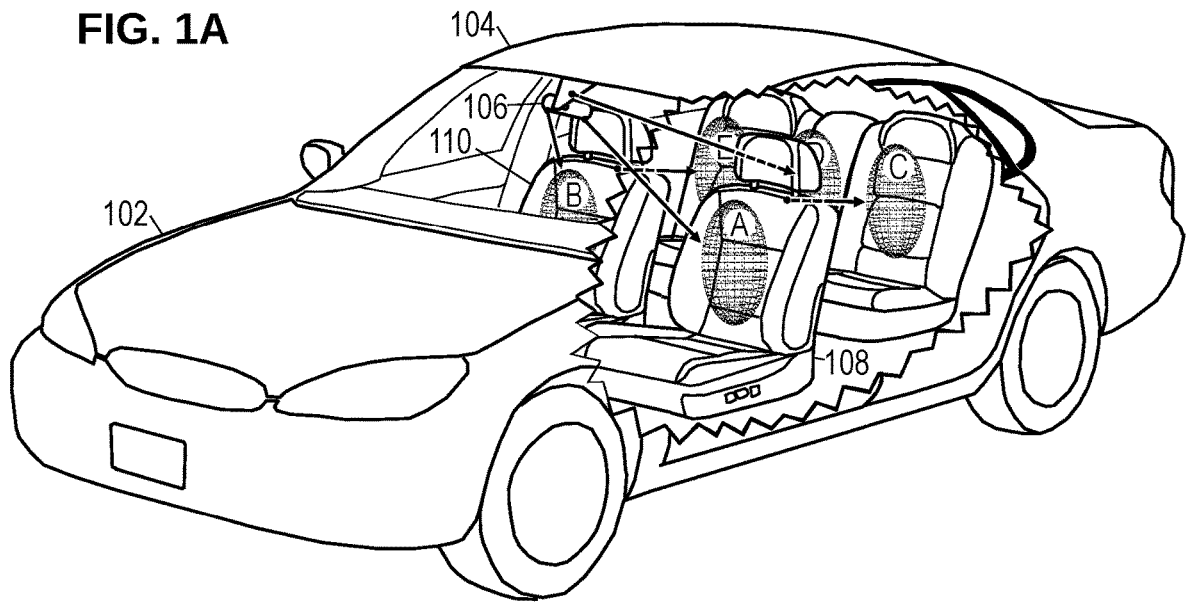
FIG. 1A is a cutaway perspective view of an illustrative vehicle having an occupancy monitoring system.

FIG. 1A shows an illustrative vehicle 102 having five seats, or more generally, "stations", designed to accommodate occupants, each of the stations having an associated volume (labeled A through E) that would be at least partially filled by the occupant of that station. The vehicle 102 further includes a roof 104 to enclose the vehicle's cabin, though in at least some embodiments the vehicle's cabin need not be enclosed. One or more breathing sensors are provided to monitor the driver's seat, the rear seats, and/or any other available occupant stations. In FIG. 1A, the rearview mirror assembly 106 includes three such sensors while two additional sensors are respectively located on the backs of the front seats 108, 110.

Because the field of view for piezoelectric transducer-based acoustic sensors is relatively narrow (on the order of) 90°, each available station is monitored by a corresponding sensor. In alternative embodiments such as microelectromechanical systems (MEMS) transducer-based acoustic sensors having wide fields of view (e.g., about) 180°, a single sensor may be used to monitor multiple stations as explained further below. We note here that suitable placements for the breathing sensors will often correspond to suitable placements for microphones and/or speakers of audio sound systems including those with hands-free calling capability and/or with cabin noise attenuation capability. Accordingly certain embodiments will integrate a breathing sensor into the casing or module of one or more of the audio system components, simplifying assembly and potentially reducing cost of materials. The breathing sensors preferably operate in the ultrasonic range and may accordingly employ transducers distinct from those of the audio system components.

Figure 1B:
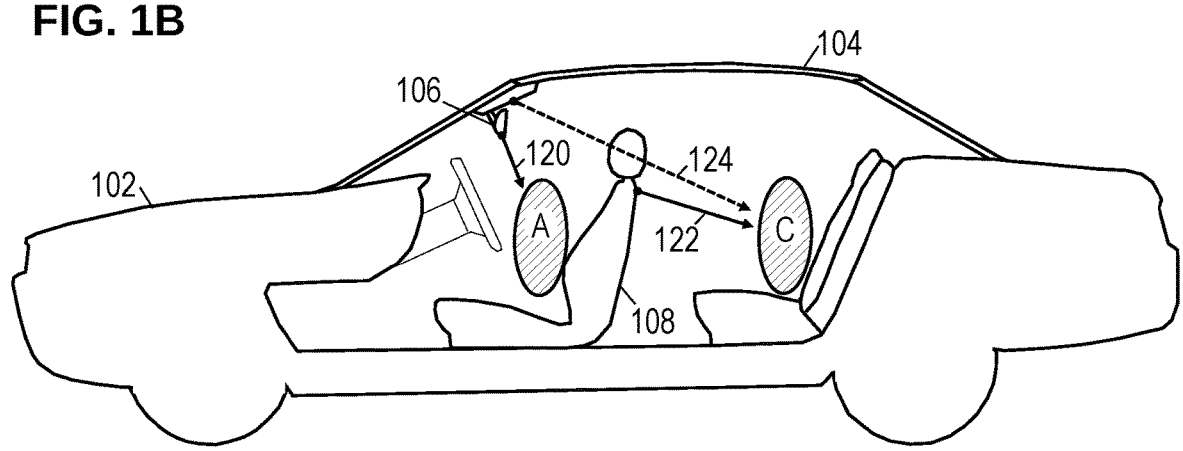
FIG. 1B is a cross section of the illustrative vehicle cabin of FIG. 1A with an occupancy monitoring system.

FIG. 1B is a cross section of the illustrative vehicle 102 showing a first travel path 120 from a breathing sensor in the rearview mirror assembly 106 to station A, a second travel path 122 from a breathing sensor in the back of front seat 108 to station C, and a travel path 124 from another breathing sensor in the rearview mirror assembly 106 to station D (hidden by station C in FIG. 1B but visible in FIG. 1A). Similar travel paths are available to stations B and E (FIG. 1A). These breathing sensor placements are merely illustrative. Alternative placements include roof 104, the dashboard, the center console, and the inner door panels. The embodiments described below focus on each sensor performing both the transmitting of acoustic bursts and the receiving of the corresponding echoes with a single transducer, but contemplated alternatives include the use of a transmit transducer distinct from the receive transducer, whether in the same sensor module or within a different sensor module. Each transmit transducer can cooperate with multiple receive transducers to provide multiple spatially separated measurements. In situations involving multiple sensors, their acoustic bursts can be distinguished using time multiplexing, frequency multiplexing, and/or spatial separation.

Figure 2:
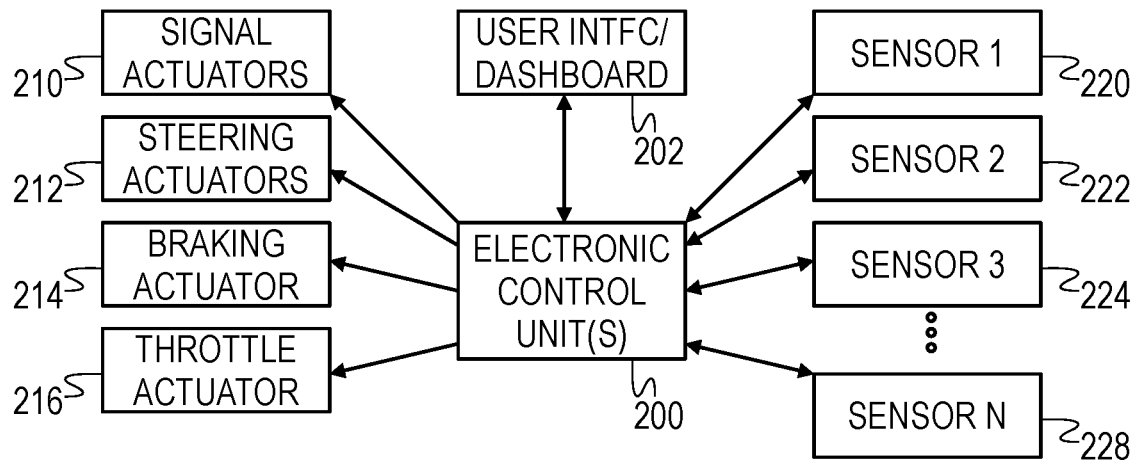
FIG. 2 is a block diagram of an illustrative vehicle network.

FIG. 2 shows an illustrative vehicle network including an electronic control unit (ECU) 200 coupled to a user interface 202 to accept user input and provide a display of the various measurements and system status, e.g., via the instrument panel on a dashboard. The ECU 200 further couples to various sensors 220-228 and various actuators such as a turn-signal actuator 210, a steering actuator 212, a braking actuator 214, and throttle actuator 216, which the ECU 200 can employ to provide parking assistance or other forms of automated driving assistance such as lane-change assistance, obstacle and blind-spot detection, automated parking, etc. FIG. 2 shows the vehicle network having a star topology with the ECU 200 at its center, but in most cases the network will include multiple ECUs connected in a hierarchical topology. Other topologies including serial, parallel, ring, and mesh topologies, are also suitable and contemplated for use in accordance with the principles disclosed herein.

Sensors 220-228 include one or more breathing sensors. The breathing sensors are preferably acoustic transceivers, or more preferably ultrasonic transceivers that can each transmit bursts of ultrasonic sound and receive the resulting reflections. Emitted bursts propagate outward from the transducer until they encounter and reflect from an object or some other form of acoustic impedance mismatch. The reflected bursts return to the vehicle as echoes of the emitted bursts. The times between the emitted bursts and received echoes are indicative of the distances to the reflection points. In many systems, only one sensor transmits at a time, though all the sensors may be configured to measure the resulting echoes. However multiple simultaneous transmissions can be supported using orthogonal waveforms, transmissions to non-overlapping detection zones, or transmissions with signatures that enable screening of any echoes from different transmitters.

For the sake of clarity, the term "burst" as used herein refers to a single carrier-modulated (fixed frequency) or chirp-modulated (swept frequency) pulse, which may be one of a series of bursts created by driving an ultrasonic or other acoustic transducer. Chirp-modulated pulses may have a longer duration than a typical carrier-modulated pulse, for instance more than 1 millisecond, such as in the range of 2-3 milliseconds. Different carrier frequencies and/or chirp rates can be employed to enable multiple sensors to operate concurrently and still distinguish their self-generated echoes from other echoes.

Figure 3:
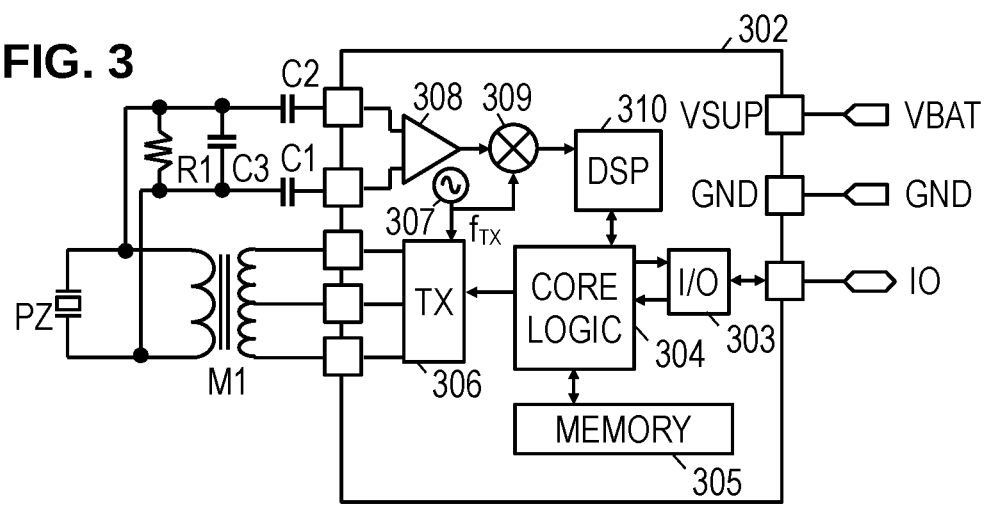
FIG. 3 is a circuit schematic of an illustrative acoustic breathing sensor.

One potential sensor configuration is now described with reference to FIG. 3. The illustrated sensor configuration employs the DSI3 communication and power supply standard, but other techniques such as those provided in the LIN, CAN, and SENT standards would also be suitable and are contemplated for use in accordance with the principles disclosed herein. Besides the two power terminals (Vbat and GND) shown in the implementation of FIG. 3, each of the illustrative ultrasonic sensors is only connected to the ECU 200 by a single input/output ("I/O" or "IO") line. The I/O line may be biased to the supply voltage (the "de-asserted" state) by a pull-up resistor when it is not actively driven low (the "asserted" state) by the ECU 200 or by the sensor controller 302. The communication protocol is designed to have only one of the two controllers (ECU 200 or sensor controller 302) asserting the I/O line at any given time.

The sensor controller 302 includes an I/O interface 303 that, when placed in a recessive mode, monitors the I/O line for assertion by the ECU 200 and, when placed in a dominant mode, drives the state of the I/O line. The ECU 200 communicates a command to the sensor controller 302 by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU 200 and carry out the appropriate operations, including the transmission and reception of ultrasonic bursts. To transmit an ultrasonic burst, the core logic 304 is coupled to a transmitter 306 which, with a suitably modulated local oscillator signal from a voltage-controlled oscillator 307, drives a set of transmit terminals on the sensor controller 302. The transmitter terminals are coupled via a transformer M1 to a piezoelectric element PZ. The transformer M1 steps up the voltage from the sensor controller 302 (e.g., 12 volts) to a suitable level for driving the piezoelectric element PZ (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element PZ.

As used herein, the term "piezoelectric transducer" includes not only the piezoelectric element PZ, but also the supporting circuit elements for tuning, driving, and sensing, the piezoelectric element PZ. In the illustrative implementation, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements. In the illustrated implementation, a pair of DC-isolation capacitors C1, C2 couple the piezoelectric element PZ to the sensor controller's pair of receive terminals to protect against high voltages. Further protection is provided with internal voltage clamps on the receive terminals. Such protection may be desired for the intervals when the piezoelectric element PZ is transmitting.

Commands received via the I/O line trigger the core logic 304 to operate the transmitter 306 and receiver (elements 308-310) and to provide the measurement results to the ECU 200 via the I/O line, also referred herein as a communication bus. The measurement results are herein also referred to as output data. The core logic 304 may monitor other sensor conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

As the received echo signals are typically in the millivolt or microvolt range, a front-end amplifier 308 amplifies the signal from the receive terminals. Subsequently, the received echo signals are processed by an analog-to-digital converter (ADC) and down converted by a digital mixer 309. Mixer 309 multiplies the amplified and digitized receive signal with the local oscillator signal to down convert the modulated signal to baseband, for further filtering and processing by a digital signal processor (DSP) 310. The mixer 309 is in one implementation an in-phase/quadrature (I/Q) digital mixer, giving Zero Intermediate Frequency (ZIF) IQ data as its output. (Though the term "ZIF" is used herein, the down converted signal may in practice be a low intermediate frequency or "near-baseband" signal.)

DSP 310 applies programmable methods to monitor the piezoelectric transducer during the transmission of a burst, and to detect any echoes and to process them in accordance with the sensing methods described hereinbelow. Such methods may employ signal differencing, magnitude determinations, peak detections, peak amplitude measurements, threshold comparisons, minimum intervals, frequency measurement, parameter monitoring, noise level determinations, and other customizable techniques tailored for improving reliability and accuracy. Notably, the peak detection process itself has variations, with some variations performing rising edge detection, falling edge detection, or detection of the peak maximum. The DSP 310 may further process the amplified receive signal to analyze characteristics of the transducer, such as resonance frequency and quality factor, and may further detect transducer fault states.

As mentioned above, the mixer 309 is in one implementation a quadrature mixer. This I/O digital mixer 309 has an input connected to the output of an analog-to-digital converter (not shown), an input for receiving a mixing signal $f_{TX}$, and first and second outputs for providing an in-phase signal and a quadrature signal, respectively, that correspond to an amplitude and a phase of the signal input from the acoustic transducer in the complex plane. The DSP 310 may include one or more digital filters that are configured to retrieve and use filter coefficients stored in memory for operating on the ZIF-IQ signal. More particularly, the digital filters may include low-pass filters and correlators. The DSP 310 may include programmable modules or dedicated circuitry for other operations, including phase derivation, magnitude measurement, down sampling, amplitude scaling (attenuation control), noise suppression, peak detection, reverberation monitoring, and transducer diagnostics, and an interface for host communications. The DSP 310 may operate on the received signals to derive one or more breathing signals for each seat or station within the sensor's field of view. Alternatively, the DSP 310 may acquire signal measurements that are then forwarded to the ECU 200 for additional processing including the determination of breathing signals.

Figure 4:
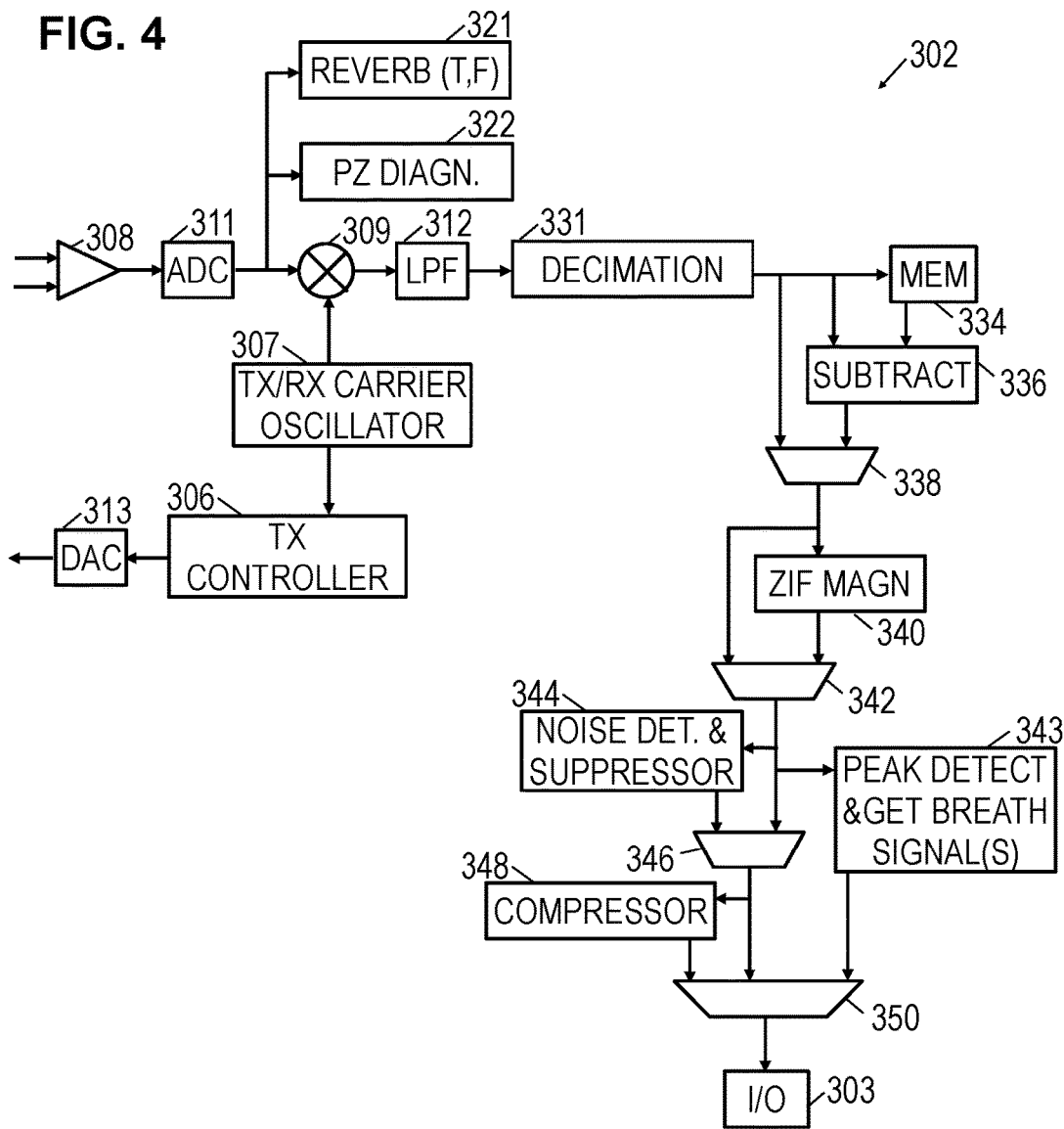
FIG. 4 is a block diagram of an illustrative sensor controller.

FIG. 4 is a block diagram of the controller 302 in an illustrative implementation. As described further below, the systematic interference processing may be performed entirely in the controller 302, or at least some of the processing may be performed by an ECU or host processor, which receives certain data via the communications bus as previous described with reference to FIGS. 2 and 3. For the sake of simplicity, FIG. 4 does not show all features of the controller 302, such as for instance the power electronics section. As discussed above with reference to FIG. 3, the controller 302 includes both a receiver and a transmitter as well as a processing circuit coupled to the receiver for conversion of a received response into output data. The processing circuit may be implemented as embedded firmware modules or application specific circuitry in a digital signal processor (DSP).

The transmitter includes an ultrasonic carrier oscillator 307, a transmitter controller 306 and a digital to analog converter (DAC) 313. The oscillator 307 may provide, e.g., a nominal carrier frequency of 50 kHz. The TX controller 306 may derive digital burst signals from the carrier signal. Depending on the system configuration, the TX controller 306 may operate solely in one channel or may alternate or otherwise employ both upper and lower channels. DAC 313 converts the digital acoustic bursts into an analog drive signal for the acoustic transducer.

After each acoustic burst, the controller 302 receives an input signal representing the response of acoustic transducer PZ (FIG. 3) optionally amplified by a front-end amplifier 308. An analog to digital converter (ADC) 311 digitizes the input signal at a relatively high sampling rate, e.g., 400 kHz. A diagnostic block 322, alone or in combination with a reverberation monitor block 321, analyzes the digitized response signal to detect and diagnose any transducer fault conditions. Some fault conditions may be indicated by, e.g., an excessively short reverberation period (which may be due to a disconnected or defective transducer, suppressed vibration, or the like), while others may be indicated by an excessively long reverberation period (defective mounting, inadequate damping resistance, or the like). The diagnostic block 322 may detect and classify multiple such transducer fault conditions, storing the appropriate fault codes in internal registers, from whence they may be communicated to the ECU. Reverberation monitor block 321 detects and signals the end of the transducer reverberation period, optionally initiating the signal processing for echo detection.

The digitized response is subsequently down converted in digital I/O mixer 309. Digital I/O mixer 309 shifts the input signal to sum and difference frequencies, in which the difference frequency is near baseband (zero intermediate frequency). I/Q digital mixer 309 outputs both an in-phase component and a quadrature component of the received signal. A lowpass filter (LPF) 312 is arranged downstream of the mixer 309 to remove certain noise components (including the input signal image at the sum frequency) from the down converted response. A decimation unit 331 reduces the sampling rate of the filtered I/O signals to, e.g., about 20 kHz. This decimated signal includes both in-phase and quadrature components of the down converted response signal and may be referred to herein as the ZIF IQ data.

A memory buffer 334 stores the ZIF IQ data, making the previous response available to a subtraction element 336. The subtraction unit 336 subtracts the previous response from the current response, producing a difference signal having both I and Q components. A multiplexer 338 selects between the current response and the difference signal, enabling the subtraction element 336 to be optionally bypassed, e.g., when it is desired for the ECU to perform the signal processing. A ZIF magnitude unit 340 converts the ZIF IQ data, whether it is the current response or the difference signal, into a ZIF magnitude signal, e.g., by squaring the in-phase component signal, squaring the quadrature-phase component signal, and summing the two. The magnitude unit 340 may further determine a square root or logarithm of the summed signal. A multiplexer 342 selects between the ZIF IQ data and the magnitude signal, enabling the magnitude unit 340 to be optionally bypassed.

A breathing signal module 343 operates on the magnitude of the difference signal to track an amplitude of each peak and to derive a breathing signal as described further below. As an alternative processing path, a noise detector/suppressor block 344 operates on the signal selected by multiplexer 342, applying attenuation compensation to amplify peaks representing echoes and a nonlinear function to suppress noise. Another multiplexer 346 selects between the output of block 344 and the output of multiplexer 342, enabling block 344 to be bypassed if desired. An optional compressor block 348 operates on the signal selected by multiplexer 346 to reduce the number of bits needed to represent the signal, thereby reducing the bandwidth needed to communicate the signals to the ECU. An output multiplexer 350 selects between compressed and uncompressed data and the breathing signal for the sensor interface block 303 to communicate the measurement information to the ECU.

Figure 5:
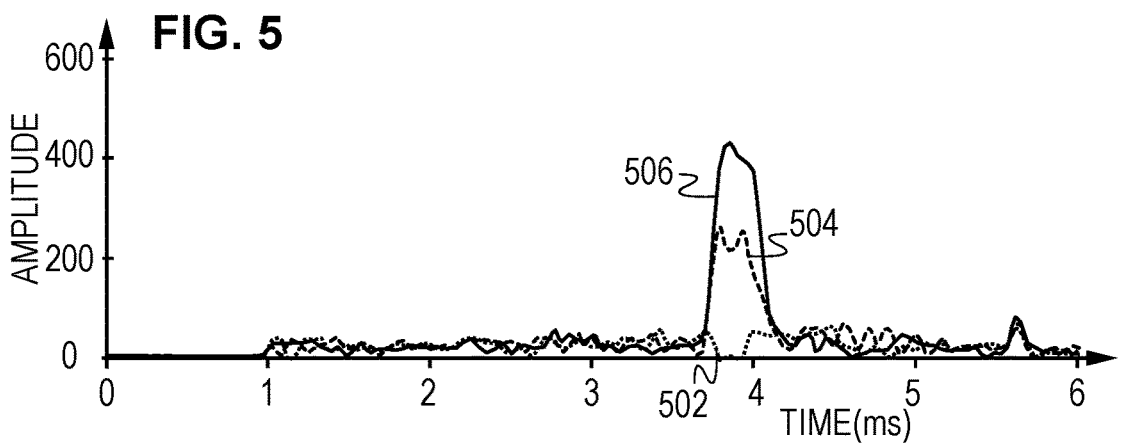
FIG. 5 is a graph showing illustrative magnitude signals obtained from response differences.

FIG. 5 is a graph of three illustrative signals produced by ZIF magnitude unit 340 when multiplexer 338 selects the difference signal from subtraction element 336. Signal 502 shows the magnitude of an illustrative difference signal when there is no motion of a person or other reflector at 60 cm from the transducer. (The amplitude axis employs arbitrary units, but could be taken as, e.g., millivolts.) Though the current and previous response signals may exhibit a strong echo at about 4 ms, the subtraction element 336 causes the echo peaks to cancel in the absence of motion, yielding a negligible noise signal with a magnitude below 50. Signal 504 shows the difference signal's magnitude when the person or reflector moves by 2 mm, and signal 506 shows the corresponding signal when the person or signal moves by 4 mm. These displacements are less than the acoustic burst wavelength (approximately 7 mm), but displacements as small as 0.7 mm can nevertheless produce a significant phase change in the response signal, leading to a very detectable peak in the difference signal's magnitude.

A typical adult exhibits an estimated one to two centimeters of stomach/chest displacement when breathing quietly at a rate of 12 breaths per minute (0.2 Hz), producing a sinusoidal variation with peak velocities greater than 4 mm/s. At sampling rates in the range of 2-4 Hz, detectable peaks have been observed and tracked to derive a breathing signal. For faster respiration rates perhaps more correlated with alert driving, the displacement range and breathing rates are expected to be higher.

The stomach/chest displacement and velocity while breathing is essentially sinusoidal. However, though the amplitude of the signal peaks in FIG. 5 increases with displacement, this relationship is not monotonic, and harmonics may be introduced into the dependence of the peak amplitude on time. Nevertheless, the periodic return-to-zero associated with the transition from inhale to exhale and vice versa can be tracked to accurately determine breathing frequency of a human occupant of a vehicle. Alternatively, a Fast Fourier Transform (FFT) can be performed to determine the fundamental frequency that represents the breathing rate.

Figure 6A:
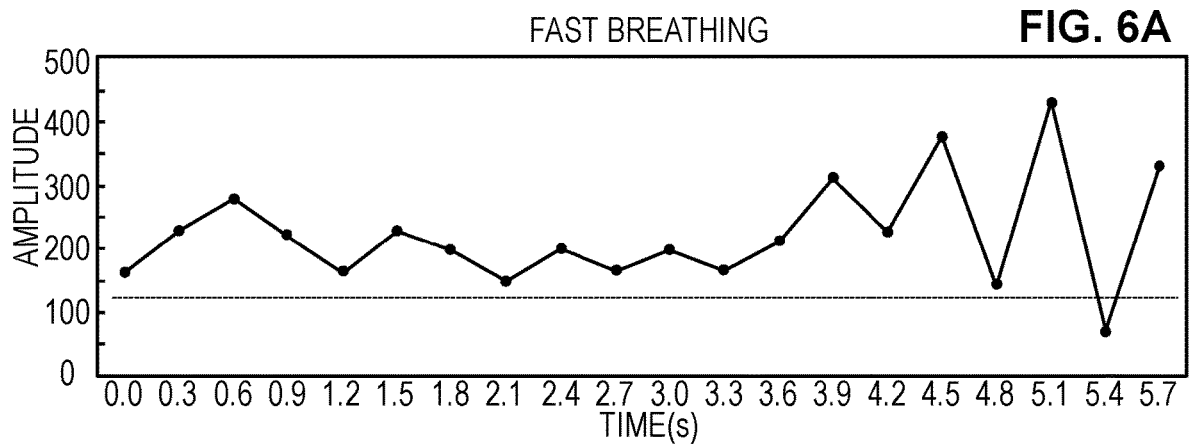
FIGS. 6A-6C are graphs of illustrative peak amplitudes as a function of time.
Figure 6B:
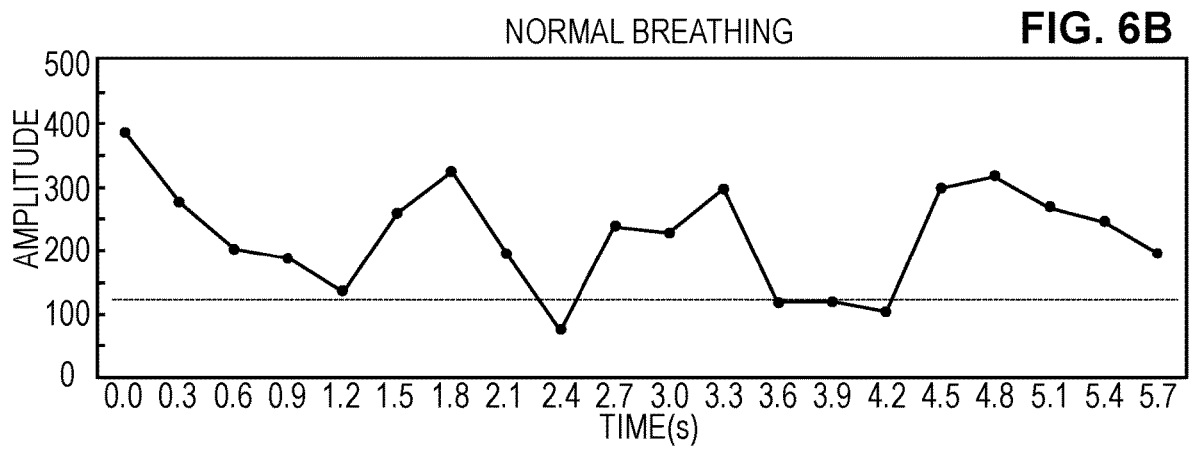
Figure 6C:
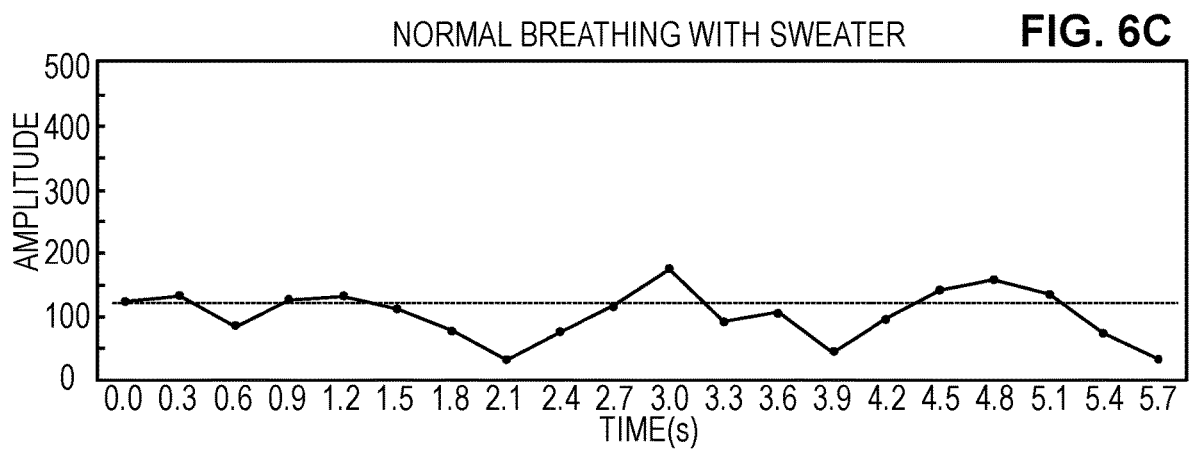

FIG. 6A is a graph of an illustrative peak amplitude as a function of time with a sampling interval of 300 milliseconds. In this test, the subject was breathing rapidly (approximately 30 breaths per minute), yielding peak amplitudes that were almost continuously above 125. (This threshold was chosen to be 3× the noise level, but other thresholds could be preset or could be determined adaptively.) FIG. 6B is a graph of an illustrative peak amplitude as a function of time when the subject was breathing normally (approximately 15 breaths per minute), yielding peak amplitudes that periodically grow and diminish but average well above the threshold of 125. Even in the presence of a blanket or heaving clothing, the ultrasonic breathing sensor continues to operate. FIG. 6C is a graph of an illustrative peak amplitude as a function of time when the subject was breathing normally while wearing a heavy sweater. The average amplitude drops to near the threshold level but continues to exhibit a clear periodicity.

Figure 7:
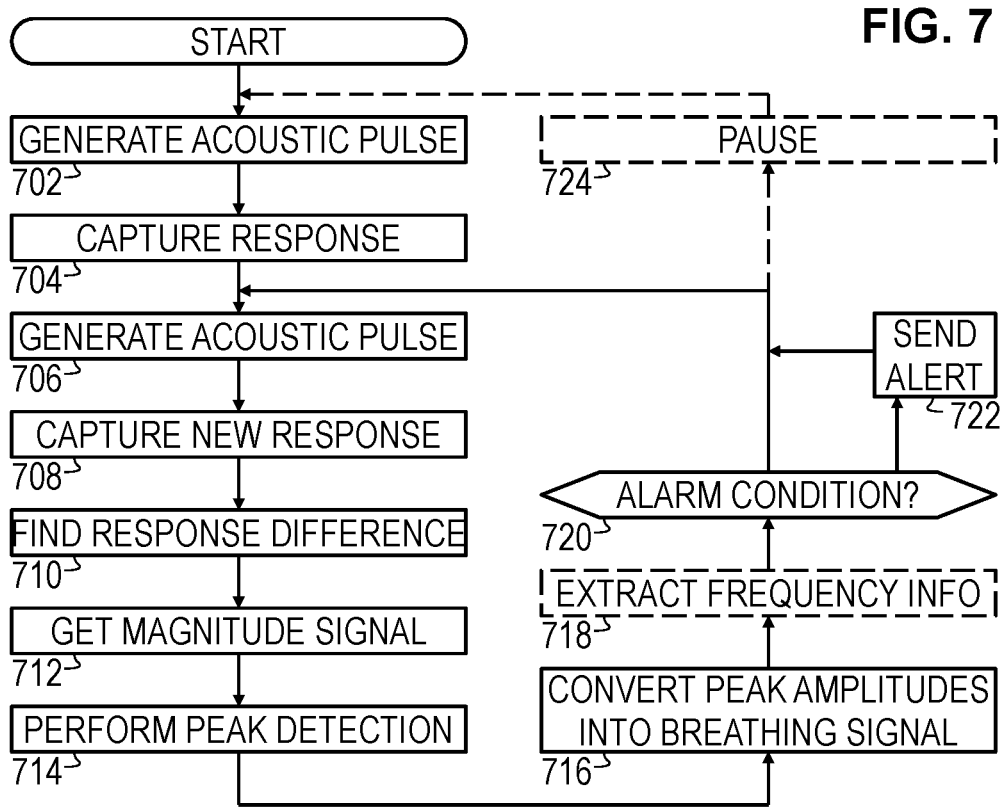
FIG. 7 is a flow diagram of an illustrative sensing method.

FIG. 7 is a flow diagram of an illustrative sensing method that may be implemented by controller 302. It begins in block 702 with the transmitter generating an acoustic pulse and the receiver digitizing a response signal including any echoes of the acoustic pulse. The digitized response signal is captured by the buffer memory in block 704. In block 706 the transmitter generates a second acoustic pulse, and the receiver digitizes a current response signal that may be captured by the buffer memory in block 708. In block 710, the subtraction element subtracts the previous response from the current response to produce a difference signal, and in block 712 the magnitude unit determines the magnitude of the difference signal.

In block 714, the DSP detects any peaks in the magnitude signal and tracks their amplitude as a function of time. In some implementations, the DSP determines the amplitude of the biggest peak, which corresponds to the maximum value of the magnitude signal. Preferably, however, the DSP is programmed with a preset distance corresponding to the position of the seat or station to be monitored and determines the amplitude of the biggest peak in a suitable time window corresponding to that preset distance. In an alternative implementation, the DSP adaptively determines the suitable time window, e.g., to allow for adjustments to the seat position. In some contemplated implementations, the transducer is provided with a position and field of view that enables monitoring of multiple seats or stations at different distances from the transducer. The DSP may determine the position and amplitude of multiple peaks, converting the time variation of each such peak to a breathing signal for a corresponding occupant position. To enable breathing signal determination, the DSP accumulates measurements of the one or more peak amplitudes as a function of time, e.g., 3 seconds, 5 seconds, 6 seconds, 10 seconds, or any accumulation window in the range from 3 to 30 seconds.

In block 716, the DSP analyzes the accumulated measurements to derive at least one breathing signal, which as previously noted may be associated with a specific seat or station or occupant position. In some implementations, the DSP compares the peak amplitudes to a threshold and asserts a flag or other form of Boolean signal representing an asserted breathing signal when the threshold is exceeded at least a minimum number of times in a moving window, e.g., at least 4 times in the last 5 seconds. Alternatively, each breathing signal may be a breathing frequency. In implementations including block 718, the DSP performs a Fast Fourier Transform (FFT) on the peak amplitudes for a given station to determine if the spectrum has a peak, e.g., in the range between eight and forty breaths per minute. Alternatively, or in addition to comparing the peak amplitudes of the magnitude signal to a threshold, the DSP may compare the amplitude of the spectrum peak with a threshold to detect an occupant's presence. As an alternative to performing a full FFT, the DSP may apply a bandpass filter to the peak amplitude signal, thereby suppressing any frequency components not in the range of interest.

We note here that in some implementations, the transducer is sensitive not only to ultrasonic bursts but also to the audible spectrum (i.e., frequencies below 20 kHz). For example, MEMS transducers can detect both audible and ultrasonic frequencies. Alternatively, an ultrasonic transducer may be integrated with a component of a vehicle's audio system such as a microphone. In both such implementations, the controller may be configured to perform not only the derivation of a breathing signal from echoes of acoustic bursts, but also processing of the audible spectrum to supplement the breathing signal with a characterization of the breathing signal type. The audible spectrum processing may be made conditional upon ultrasonic spectrum-based detection of a breathing signal or may be performed in parallel with the ultrasonic spectrum-based processing. Examples of audible spectrum processing may include, in addition to echo cancellation of any audio system output, pattern matching to detect indications of distress such as wheezing, coughing, crying, or hyperventilation. Such pattern matching can be performed, e.g., using a neural network, and can accordingly improved the quality of in-cabin monitoring.

In block 720, the DSP evaluates the breathing signal and any supplemental audible spectrum based information to determine whether an alarm condition exists. One illustrative alarm condition is when the breathing signal for the driver's seat is de-asserted or indicating a breathing frequency that is too low (e.g., less than 12 breaths per minute which may indicate a sleepy driver) or too high (e.g., greater than 30 breaths a minute which may indicate distraction or a medical impairment). Another illustrative alarm condition may be a breathing frequency that varies erratically, which may indicate exhaustion or a medical impairment. Yet another illustrative alarm condition is a driver's breathing signal position that varies too much indicating that the driver is moving around. Still another illustrative alarm condition is when a driver exits the vehicle (perhaps indicated by the opening and closing of the driver side door) while a breathing signal is asserted for a back seat station.

When an alarm condition is detected, the DSP may send an alert in block 722. The alert may take the form of an error condition or message communicating the alarm condition to the ECU, enabling the ECU to determine the type of alarm and to take the appropriate action. For example, if back seat occupancy is detected when the driver exits the vehicle, the ECU may sound the horn, lower the windows, and/or unlatch the doors or prevent the driver's door from latching closed. As another example, if driver impairment is detected, the ECU may reduce the vehicle's velocity, activate emergency blinkers, and/or steer the vehicle to the shoulder of the road.

In the absence of an alarm condition, or after an alarm condition has been signaled, the sensor controller returns to block 706, obtaining responses to regularly spaced acoustic bursts. In some contemplated alternative implementations, the sensor controller pauses periodically in block 724, potentially even between pairs of acoustic bursts, to reduce power consumption. In this case, the controller resumes with block 702.

Though the operations shown and described above are treated as being sequential for explanatory purposes, in practice the process may be carried out by multiple integrated circuit components operating concurrently and perhaps even speculatively to enable out-of-order operations. The sequential discussion is not meant to be limiting. Further, the foregoing description has presumed the use of an I/O line bus, but other bus implementations including LIN, CAN and DSI3 are contemplated. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A method that comprises:
    sensing an acoustic transducer's responses to a series of acoustic bursts;
    differencing pairs of said responses to obtain difference signals;
    converting the difference signals into magnitude signals each representing a time-dependent magnitude of a difference between responses in one of the pairs of said responses;
    performing peak detection on each of the magnitude signals to obtain at least one peak amplitude; and
    providing a breathing signal based on the at least one peak amplitude.

2. The method of claim 1, wherein said performing peak detection includes determining a peak amplitude for each of multiple peaks in each of the magnitude signals, and wherein a breathing signal is determined for each of the multiple peaks.

3. The method of claim 2, further comprising associating each of the breathing signals with a respective position in a vehicle's cabin.

4. The method of claim 1, wherein said providing a breathing signal includes comparing the at least one peak amplitude to a predetermined threshold.

5. The method of claim 4, wherein said providing a breathing signal further includes asserting the breathing signal only if a moving window contains at least a minimum number of times that the peak amplitude exceeds the predetermined threshold.

6. The method of claim 1, wherein said providing a breathing signal includes determining a breathing frequency of a human occupant of a vehicle.

7. The method of claim 6, wherein said providing a breathing signal includes performing a Fast Fourier Transform of the at least one peak amplitude as a function of time to determine the breathing frequency.

8. The method of claim 6, further comprising: setting an alert if the breathing frequency indicates an impaired driver.

9. The method of claim 1, further comprising: setting an alert if the breathing signal indicates a rear seat occupant of a vehicle when a front door of the vehicle is opened.

10. A controller for an acoustic transducer, the controller comprising:
a receiver configured to sense the acoustic transducer's response to each of a series of acoustic bursts; and
a processing circuit configured to derive a breathing signal from said responses in part by:
obtaining difference signals from pairs of said responses;
converting each difference signal into a magnitude signal representing a time-dependent magnitude of that difference signal; and
performing peak detection on each said magnitude signal to obtain at least one peak amplitude.

11. The controller for an acoustic transducer of claim 10, wherein said performing peak detection includes determining a peak amplitude for each of multiple peaks in each of the magnitude signals, and wherein a breathing signal is determined for each of the multiple peaks.

12. The controller for an acoustic transducer of claim 10, wherein said processing circuit is configured to derive the breathing signal in part by: comparing the at least one peak amplitude to a predetermined threshold; and asserting the breathing signal only if a moving window contains at least a minimum number of times that the peak amplitude exceeds the predetermined threshold.

13. The controller for an acoustic transducer of claim 10, wherein said processing circuit is configured to derive the breathing signal in part by determining a breathing frequency of a human occupant of a vehicle.

14. The controller for an acoustic transducer of claim 10, wherein said processing circuit is configured to derive the breathing signal in part by performing a Fast Fourier Transform of the at least one peak amplitude as a function of time to determine a breathing frequency of a human occupant of a vehicle.

15. The controller for an acoustic transducer of claim 14, further comprising: a status register having a flag signifying whether the breathing frequency indicates an impaired driver.

16. A vehicle that comprises:
at least one seat configured to accommodate an occupant;
at least one acoustic transducer configured to receive a series of acoustic burst echoes from the occupant when the occupant is present in the vehicle; and
a controller configured to derive a breathing signal from the series of acoustic burst echoes by:
obtaining difference signals from pairs of said acoustic burst echoes;
converting each difference signal into a magnitude signal representing a time-dependent magnitude of that difference signal; and
performing peak detection on each said magnitude signal to obtain at least one peak amplitude.

17. The vehicle of claim 16, wherein as part of said performing peak detection, the controller is configured to determine a peak amplitude for each of multiple peaks in each of the magnitude signals, the peaks corresponding to occupants of different seats in the vehicle, and wherein the controller is configured to derive a breathing signal for each occupant.

18. The vehicle of claim 16, wherein the controller is configured to derive the breathing signal in part by determining a breathing frequency of the occupant.

19. The vehicle of claim 18, wherein the controller includes a status register having a flag signifying whether the breathing frequency indicates an impaired driver.

20. The vehicle of claim 16, wherein the at least one acoustic transducer is integrated with a component of an audio system for the vehicle, the component including a microphone or speaker.

* * * * *